United States Patent

Moschytz

[15] 3,679,987

[45] July 25, 1972

[54] ACTIVE RC WAVE TRANSMISSION NETWORK USING SINGLE AMPLIFIER TO ACHIEVE ALL-PASS TRANSFER FUNCTION

[72] Inventor: George Samson Moschytz, Highland Park, N.J.

[73] Assignee: Bell Telephone Laboratories, Incorporated, Murray Hill, Berkeley Heights, N.J.

[22] Filed: Nov. 24, 1970

[21] Appl. No.: 92,399

[52] U.S. Cl. ............................... 330/107, 330/109, 330/112

[51] Int. Cl. ............................... H03f 1/36

[58] Field of Search .............. 330/21, 31, 26, 107, 109, 30 D, 330/112

[56] References Cited

OTHER PUBLICATIONS

Mitra, " Active RC Filters Employing A Single Operational Amplifier As The Active Element," Proceedings of the Hawaii International Conference on System Sciences, January 1968, pp 433–436

*Primary Examiner*—Roy Lake
*Assistant Examiner*—James B. Mullins
*Attorney*—R. J. Guenther and Kenneth B. Hamlin

[57] ABSTRACT

A resistance-capacitance network in circuit with a single operational amplifier provides an all-pass 360° phase transfer function. The single amplifier is arranged for operation in the differential mode with the signal to be controlled applied directly to the inverting input and through an amplitude shaping network to the noninverting input. Depending on whether the shaping network is loaded with a parallel or series resistance-capacitance combination parasitic phase shift or signal loss in the amplifier can also be compensated.

3 Claims, 3 Drawing Figures

INVENTOR
G. S. MOSCHYTZ
BY J. P. Kearns
ATTORNEY

ACTIVE RC WAVE TRANSMISSION NETWORK USING SINGLE AMPLIFIER TO ACHIEVE ALL-PASS TRANSFER FUNCTION

BACKGROUND OF THE INVENTION

1. Field of the Invention

This invention relates to active wave transmission networks and, more specifically, to active resistance-capacitance networks exhibiting an all-pass phase transfer function.

2. Description of the Prior Art

There are many applications for all-pass transfer functions in electric wave transmission networks. Important among these are the delay line used in transversal equalizers and the delay unit used in differentially coherent phase modulation data receivers. Prior art filters for providing such a transfer function have either required the use of inductors and capacitors in combination or active networks employing resistors and capacitors. Filters which employ inductors are usually bulky and unsuited to integrated circuit realization. Active networks which eliminate inductors require, on the other hand, heat-generating amplifiers. What is needed is an active resistance-capacitance (RC) filter which generates the least amount of heat, such as one using only one amplifier.

While single-amplifier RC filters are known for amplitude control of frequency response, RC filters providing the general all-pass function with a reasonably high Q-value, i.e., selectivity or ratio of reactive to resistive immittances at frequencies of natural resonance, have been found unsatisfactory. Particularly the loss inherent in single-amplifier RC filters has limited cascade connection of such filters when it becomes desirable to form high-order transfer functions.

An object of this invention is to provide a general second-order all-pass phase transfer function using a single amplifier in combination with resistors and capacitors only.

Another object of this invention is to provide an all-pass phase transfer function in a form suitable for implementation with batch-processed integrated circuit techniques.

It is a further object of this invention to provide an all-pass phase transfer function in the form of cascadible sections without introducing significant signal attenuation.

SUMMARY OF THE INVENTION

According to this invention, the above and other objects are attained in a single-amplifier all-pass network by providing a second-order passive RC filter network in series with the noninverting input of a differential amplifier, a positive feedback connection between the output of the differential amplifier and the filter network, a negative feedback connection between the output of the differential amplifier and its inverting input, and a direct connection between the input of the filter network and the inverting input of the differential amplifier. Both the negative feedback and direct connections to the inverting input of the differential amplifier are advantageously resistive. The input to the RC filter network forms the input of the overall network. The output of the differential amplifier forms the output of the exemplary all-pass circuit.

The all-pass circuit of this invention embodies a building block concept and represents an inductor-free circuit which is compatible with batch-processed integrated-circuit techniques. It is also compatible in structure with circuits for amplitude shaping. Furthermore, the nature of the output loading of the RC network can be controlled to render the overall network lossless or free of parasitic phase shift. Thus, individual all-pass sections for delay compensation become cascadible with each other and with amplitude-shaping sections.

DESCRIPTION OF THE DRAWING

A full and complete understanding of the invention can be obtained from a consideration of the following detailed description and the drawing in which:

FIG. 2 is a schematic diagram of a representative embodiment of the all-pass circuit of this invention including a twin-T filter network with parallel output loading; and FIG. 3 is a schematic diagram of an alternative RC filter network with series output loading useful in the practice of this invention.

DETAILED DESCRIPTION

Figure 1:
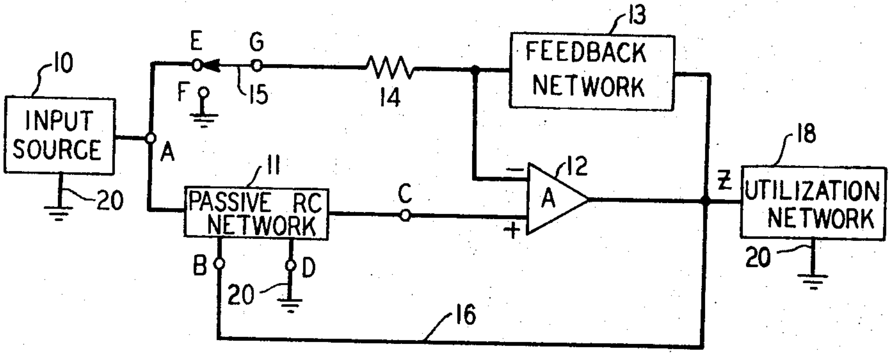
FIG. 1 is a block diagram of the all-pass circuit of this invention.
Figure 1:
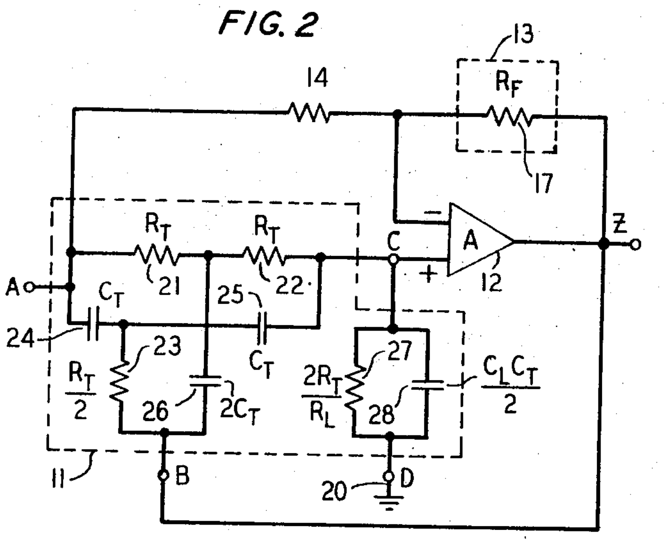
Figure 1:
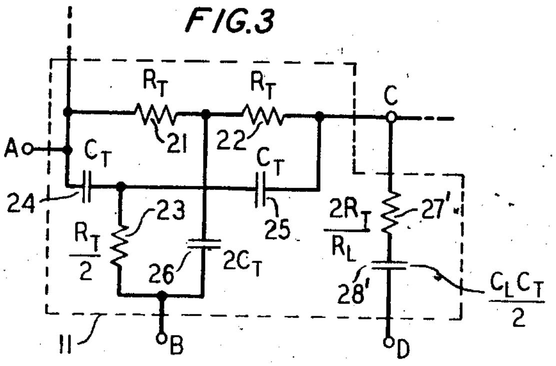

In the electric wave transmission network shown in FIG. 1 of the drawing the input signal to be operated on is furnished by input source 10, which has a common connection at ground 20 and an output connection at junction A. Input source 10 typically comprises a transmission system for analog or digital message signals. Such a system is generally subject to undesired amplitude and phase effects, the latter of which particularly are to be compensated in the wave transmission circuit of this invention. Signals operated on by the network of this invention are to be delivered for demodulation, detection or decoding at terminal Z to utilization network 18, which has a common connection to ground 20. In the alternative either or both of input source 10 and utilization circuit 18 may be additional wave transmission networks of the type shown in FIG. 1. Any desired overall delay may be achieved by connecting a plurality of networks of the type shown in FIG. 1 in tandem.

As shown in FIG. 1, the inventive wave transmission network comprises, between input terminal A and output terminal Z, passive RC network 11, differential amplifier 12 with respective inverting (−) and noninverting (+) input and output terminal Z, feedback network 13 between the output and the inverting input of differential amplifier 12, input resistor 14 for the inverting input of amplifier 12, and feedback path 16 between output terminal Z and RC network 11.

FIG. 1 also shows transfer switch 15 having a blade pivoting on terminal G connected to resistor 14 and terminals E and F selectively connectable to terminal G. Terminal E is connected to input terminal A and terminal F to common ground 20.

When switch 15 is grounded to terminal 20, the wave transmission network of FIG. 1 constitutes a known active amplitude filter section such that the null frequency of passive RC network 11 is translated into a frequency of resonance at the output of amplifier 12 by virtue of positive feedback path 16. Negative feedback network 13 grounded through resistor 14 stabilizes the gain of amplifier 12. The overall result is a transfer function which can be made to exhibit the frequency characteristics of any arbitrary second-order transfer function, e.g., low-pass, band-pass or high-pass characteristics, depending on the nature of passive RC network 11. When the overall transfer function is to have frequency rejection characteristics (i.e. zeros on the $j\omega$-axis) then the passive RC network 11 itself comprises a frequency-rejection or notch filter. The twin-T and bridged-T circuits are representative examples of notch filters suitable for use as network 11.

Such a wave transmission network employs the single-amplifier building-block concept compatible with batch processing of integrated circuits. The basic building block can be trimmed by appropriate means, such as scribing, etching or cutting, to furnish any second-order amplitude control function. The single-amplifier active-filter building block concept is an outgrowth of work described by R. P. Sallen and E. L. Key in their paper "A Practical Method of Designing RC Active Filters" published in Institute of Radio Engineers Transactions on Circuit Theory, Volume CT–2, March 1955 at pages 75 through 85.

It is the essence of this invention that the building block concept is expanded to encompass the all-pass frequency-response characteristic while permitting a wide range of phase response adjustments over a full 360° range. To achieve the all-pass function the known amplitude section of FIG. 1 with switch 15 bridging terminals F and G is modified by moving the switch blade 15 to interconnect terminals E and G, thus directing the output of source 10 to the inverting input of amplifier 12 through resistor 14. Resistor 14 then becomes a summing resistor and the input signal from source 10 is combined with the negative feedback signal from the output of differential amplifier 12. The result obtained from this differential input mode is the projection of the conjugate transmission zeros of the passive RC null network, which in the absence of the direct connection of the input signal to the differential amplifier lie on or near the imaginary axis of the complex frequency plane, into the right half-section of the plane. It may be noted that the zeros of the bridged-T null network are farther from the imaginary axis than those of the twin-T. At the same time the poles of passive RC null network 11 lying, in the absence of positive feedback path 16, on the negative real axis, are moved into the left half-section of the complex frequency plane in conjugate relationship. By appropriate proportioning of feedback network 13 and summing resistor 14, together with tuning of network 11, the respective conjugate poles and zeros of the overall transfer function are positioned in mirror image relationship to the imaginary axis of the complex frequency plane. Such a mirror-image or quadrantal symmetric placement of poles and zeros is known to be characteristic of the all-pass transfer function. (Reference may be made in this connection to Chapter 3, FIG. 3.10, of Circuit Theory and Design by J. L. Stewart, John Wiley and Sons, Inc., New York 1956.) The amplitude function of an all-pass network as observed along the imaginary axis of the complex frequency plane is constant. The phase function, however, is characterized as nonminimum and possesses a phase reversal at the pole frequency. It is susceptible to adjustment over a full 360° range.

Prior art attempts to achieve the all-pass transfer function using active RC filters have required separate amplifiers for pole and zero control.

FIG. 2 shows in greater detail a circuit schematic diagram of an all-pass network according to this invention in which passive network 11 of FIG. 1 is shown as a twin-T network and feedback network 13, as a resistor 17. A bridged-T or other equivalent notch or frequency-rejection network is also applicable. In addition to the twin-T network block 11 includes parallel output loading comprising resistor 27 and capacitor 28.

RC network 11, including the twin-T and loading sections, is a four-terminal network. Terminals A, B, C, and D are respectively the input, control, output, and common terminals. Between input A and output C terminals there are two parallel paths containing respectively series combinations of resistors 21 and 22 and capacitors 24 and 25. In addition, there are internal shunt paths between control terminal B and the junctions of resistors 21 and 22 and the junctions of capacitors 24 and 25 including respectively capacitor 26 and resistor 23. Output terminal C is moreover returned to common terminal D through the parallel combination of resistor 27 and capacitor 28. In order for network 11 to have a sharp null it is well known that the several parameters are made symmetrical, that is, resistors 21 and 22 are made equal to $R_T$, capacitors 24 and 25 are made equal to $C_T$, and shunt resistor 23 and shunt capacitor 26 are made respectively equal to $R_T/2$ and $2C_T$. The values of resistors 27 and 28 remain to be demonstrated.

The circuit of FIG. 2 may be analyzed in the following manner. The voltage transfer parameters between terminals A and C and B and C are:

$$t_{CA} = \frac{V_C}{V_A}\bigg|_{V_B=0} = \frac{n_{CA}}{d_{CA}} \qquad (1)$$

and $$t_{CB} = \frac{V_C}{V_B}\bigg|_{V_A=0} = \frac{n_{CB}}{d_{CB}}, \qquad (2)$$

where the $V$s are voltages measured at the subscript terminals and $n$ and $d$ are respectively numerator and denominator polynomials to be discussed more fully hereinafter. Because of the symmetry of the twin-T network $d_{CA}=d_{CB}$ and the overall transfer function of the all-pass network of FIG. 2, adopting $\beta$ as the closed loop gain of amplifier 12, becomes:

$$T(s) = E_Z/E_A = \frac{1-\beta(1-t_{CA})}{1-\beta t_{CB}} = \frac{d(1-\beta)+\beta n_{CA}}{d-\beta n_{CB}}. \qquad (3)$$

Taking the output loading into account, equations (1) and (2) can be expanded as follows:

$$t_{CA} = \frac{1}{1+C_L}\,\frac{s^2+\omega_Z^2}{s^2+s\omega_P/q_R+\omega_P^2} \qquad (4)$$

$$t_{CB} = \frac{1}{1+C_L}\,\frac{4s\omega_Z}{s^2+s\omega_P/q_R+\omega_P^2}, \qquad (5)$$

where $$\omega_Z = (R_T C_T)^{-1}, \qquad (6)$$

$$\omega_P = \omega_Z(1+R_L)^{1/2}(1+C_L)^{-1/2} \qquad (7)$$

and $q_R = [(1+R_L)(1+C_L)]^{1/2}[4+R_L+C_L]^{-1}$, (8)

where $R_L$ and $C_L$ are scaling factors for resistor 27 and capacitor 28 in the output loading network.

Equation (4) indicates that the twin-T networks exhibit zeros (from the numerator) substantially on the imaginary axis of the complex frequency plane $s$ at the rejection frequency $\omega_Z$ and that the poles (from the denominator) are on the negative real axis at the frequency $\omega_P$ since $q_R$ and $\omega_P$ must be positive to be physically realized. Equation (5) indicates from it s numerator the presence of a zero at the origin. Its denominator is identical to that of equation (4).

Equations (3), (4) and (5) can be combined to find the active transfer function of the circuit of FIG. 2, which is of the form:

$$T(s) = K\frac{s^2+s\omega_Z/q_Z+\omega_Z^2}{s^2+s\omega_P/q_P+\omega_P^2} \qquad (9)$$

Equation (9) represents the all-pass function when $\omega_Z=\omega_P$ and $q_Z=q_P$, and from equations (6) and (7) when $R_L=C_L$. From equations (6), (7), (8), and (9) it is apparent that the frequencies $\omega_Z$ and $\omega_P$ and the zero-Q, $q_Z$, are functions of resistance and capacitance only. The pole-Q, $q_P$, depends on the closed-loop gain $\beta$ of the differential amplifier, as can be demonstrated by equating equations (3) and (9). Thus, remembering that $R_L=C_L$ $$q_P = \frac{1+R_L}{4(1-\beta)+2R_L}. \qquad (10)$$

Furthermore, $$q_Z = \frac{1+R_L(1-\beta)}{2(2+R_L)(1-\beta)}. \qquad (11)$$

Equations (3) and (9) also yield an expression for the overall gain factor $K$ in equation (9) and is evaluated as $$K = 1-\beta+\beta/(1+R_L). \qquad (12)$$

Equations (10) and (11) can be evaluated in terms of equation (8) to obtain expressions relating closed-loop gain $\beta$ and scaling factor $R_L$ in terms of circuit Qs. Furthermore, the factor $K$ of equation (12) can be expressed as a function of $Q$. Inasmuch as the resulting expressions are cumbersome quadratic equations they are not reproduced here. It is believed sufficient to specify qualitatively that for parallel loading the $\beta$-factor, which is zero at $Q = 0.5$, attains a maximum value of about 1.11 at $Q = 1$, and thereafter decays asymptotically to unity. Similarly, the scaling factor $R_L = C_L$ decays as $1/Q$ from an $R_L$ of about 1.5 at $Q = 1$. Finally, the value of K in decibels increases asymptotically from about $K = -10$ db at $Q = 1$ to 0 db.

The K-characteristic indicates that the all-pass network with a parallel loaded twin-T as shown in FIG. 2 is not lossless, the loss being greater at low values of $Q$. Such loss can be compensated, if necessary, in an accompanying amplitude section for a cascade of all-pass sections. On the other hand, the presence of the RC parallel combination in shunt of the high-impedance input terminal of the noninverting input of difference amplifier 12 simplifies the compensation of parasitic input capacitance at this terminal by adjusting the magnitude of the scaling factors. This parasitic input capacitance might otherwise cause a spurious phase shift in the desired all-pass characteristic. It may also be noted that parasitic phase can be compensated by deliberately unbalancing $R_L$ and $C_L$ by a small amount.

The loading network for the twin-T can be changed advantageously from the parallel combination of FIG. 2 (resistor 27 and capacitor 28) to the series combination of FIG. 3 (resistor 27' and capacitor 28'). Designators in FIGS. 2 and 3 are identical except for the loading network. With a series load arrangement an all-pass network with no loss is attainable. All the previous equations apply, except that $$q_R = 1/(4+R_L), \quad (13)$$

$$Q_Z = 1/[(4+R_L)(1-\beta)], \quad (14)$$

$$q_P = 1/(4+R_L-4\beta), \quad (15)$$

and $$K = 1. \quad (16)$$

As in the parallel loading case, $q_P = -q_Z$ and $R_L = C_L$ for an all-pass network. Equations (13) through (16) can be solved for expressions giving closed-loop gain $\beta$ and scaling factor $R_L$ in terms of $Q$. $\beta$ is found to decay asymptotically from a positive value to unity for $Q$ in the range of 0 and infinity. For $Q$ values greater than about 4 the curve substantially tracks that for the parallel loading case. $R_L$ also decays asymptotically to zero with increasing $Q$, as it does in the parallel loading case, but does not track the parallel case. For $Q$ values of practical interest from about 1 to 10, the scaling factors for the series loading case are about double those of parallel loading case, i.e., in the range of 1.6 to 0.3. Significantly, however, the $K$ factor is constant and equal to unity for series loading. Thus, in the series loading case the single amplifier all-pass RC network is lossless. Large numbers of them can be cascaded to obtain desired values of delay without incurring signal loss.

The bridged-T null structure is readily realized in FIG. 2 or FIG. 3 by omitting either shunt resistor 23 or shunt capacitor 26.

While the all-pass network of this invention has been disclosed in terms of specific illustrative embodiments, numerous modifications will occur to those skilled in the art without departing from its spirit and scope.

What is claimed is:

1. A wave transmission network for controlling the phase-frequency characteristic of broadband signals without altering the amplitude-frequency characteristic thereof comprising a differential amplifier having inverting and noninverting inputs and an output;

a frequency-determining circuit in series between an input point for said network and the noninverting input of said amplifier and in positive feedback relationship to the output of said amplifier further comprising two signal paths in parallel between input and output terminals, one of said paths including equal resistive elements in series between a first junction and said input and output terminals and the other of said paths including equal capacitive elements in series between a second junction and said input and output terminals, and two shunt paths between said first and second junctions and a common terminal, the shunt path connected to said first junction including a capacitive element of twice the value of said equal capacitive elements and the shunt path connected to said second junction including a resistive element of half the value of said equal resistive elements;

a resistive feedback connection between the output and inverting input of said amplifier; and a direct resistive connection between the input point of said network and the inverting input of said amplifier.

2. The wave transmission network defined in claim 1 in which the output terminal of said frequency is loaded with a determining circuit parallel combination of a resistive and a capacitive element whose values are related to those of said equal resistive and capacitive elements by equal scaling factors respectively dividing and multiplying the values of said equal resistive and capacitive elements.

3. The wave transmission network defined in claim 1 in which the output terminal of said frequency-determining circuit is loaded with a series combination of a resistive and a capacitive element whose values are related to those of said equal resistive and capacitive elements by equal scaling factors respectively dividing and multiplying the values of said equal resistive and capacitive elements.

* * * * *